Figure 1:
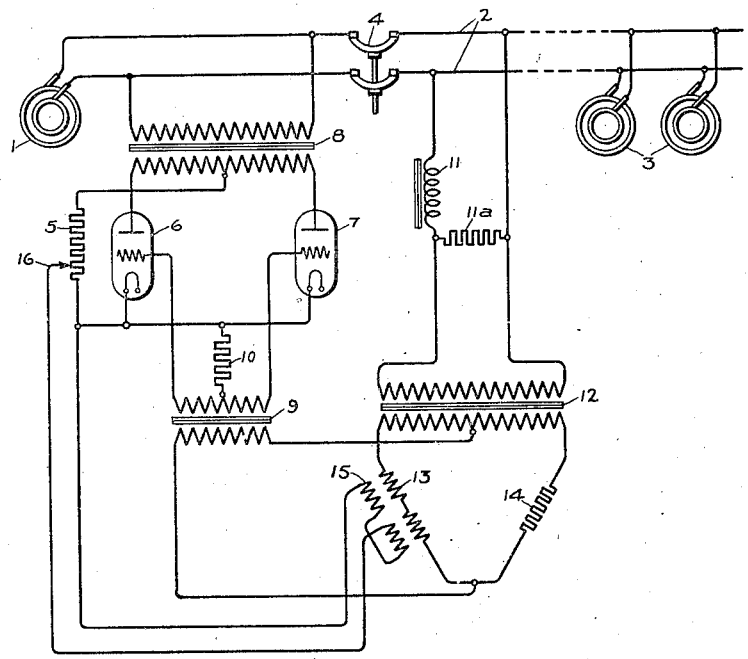

July 4, 1933.   E. F. W. ALEXANDERSON ET AL   1,917,082
SYSTEM OF ELECTRIC POWER TRANSMISSION
Filed Dec. 16, 1931        2 Sheets-Sheet 1

Inventors:
Ernst F. W. Alexanderson,
Philip L. Alger,
Samuel P. Nixdorff,
by Charles V. Mullan
Their Attorney.

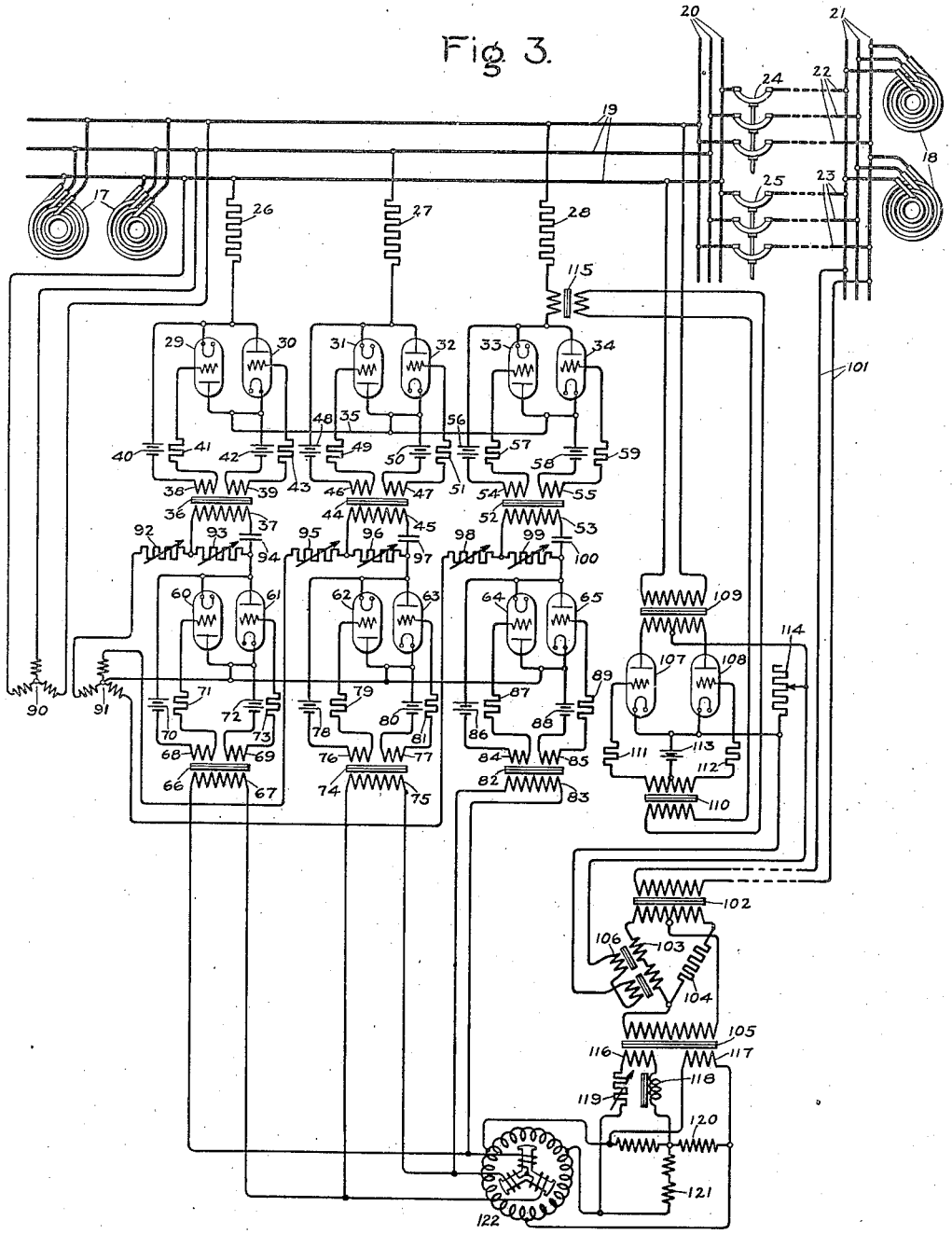

Patented July 4, 1933

1,917,082

UNITED STATES PATENT OFFICE

ERNST F. W. ALEXANDERSON, PHILIP L. ALGER, AND SAMUEL P. NIXDORFF, OF SCHENECTADY, NEW YORK, ASSIGNORS TO GENERAL ELECTRIC COMPANY, A CORPORATION OF NEW YORK

SYSTEM OF ELECTRIC POWER TRANSMISSION

Application filed December 16, 1931. Serial No. 581,367.

Our invention relates to systems of electric distribution and more particularly to the transmission of electric power between synchronous machines.

The operation of synchronous machines interconnected by a long high voltage transmission line, or by an interconnecting circuit of any length having a relatively high impedance with respect to the power to be transmitted, introduces many operating difficulties, particularly with respect to maintaining synchronous operation under the various conditions encountered in practice. The line itself may not be unstable under steady state conditions but it may be operated so near the stability limit that a fault on the line will cause a transient state during which the system is unstable and the machines pull out of synchronism. In systems including water power stations, for example, a fault on the line suddenly reduces the generator load and as a result the generator speeds up under the continued torque of the waterwheel before the governor can act, causing a transient departure from synchronism. After a lapse of several cycles the switches in the faulty circuit usually open, clearing the fault and leaving the generator tied to the load through a single circuit or a circuit having a higher reactance than before the fault. When the synchronizing power is inadequate to retard the generator and bring the generator into synchronism, the system breaks out of step. If, therefore, the kilowatt load on the generator can be suddenly increased at the moment a fault occurs, thus compensating for the reduction of the power supplied to the line, the generator will continue to run at its normal speed and the system will remain in step after the fault is cleared.

An object of our invention is to provide an improved system of transmitting electric power in distribution systems employing synchronous dynamo-electric machines.

Another object of our invention is to provide improved means for increasing the stability of an alternating current power transmission system.

Another object of our invention is to provide improved means for preventing the acceleration or retardation of synchronous machines in a system of distribution so as to prevent loss of synchronism and thereby instability during transient disturbances.

A system of electric power transmission wherein a power load is suddenly applied to the generator terminals, or generator bus, when a fault occurs on the line has been described and claimed in United States Letters Patent No. 1,834,807, granted December 1, 1931, upon an application of Wilfred F. Skeats and assigned to the assignee of the present application. This system employs fault responsive relays to operate switching means whereby the power absorbing circuit is made effective for a predetermined interval of time in accordance with the operation of the fault responsive means but independently of the relative phase relation between the voltage vector of the transmitting machine and any reference vector. In a copending application of E. F. W. Alexanderson, Serial No. 581,366 filed December 16, 1931, and assigned to the assignee of the present application, there is described and broadly claimed a system of operating synchronous machines in which the power circuit is not depended upon for the synchronizing power, but synchronization is attained artificially through an auxiliary means or circuit which causes changes in power flow continuously in a branch power circuit, either a power absorbing or power generating circuit, connected to one of the synchronous machines, in accordance with the phase relation between the transmitting and receiving machines.

According to our present invention the connection of an artificial load or power absorbing circuit to one of the synchronous machines is made dependent upon the phase relation between the voltage vector of the transmitting machine and a selected time-phase voltage vector of reference in contradistinction to the arrangement described in the above-identified Skeats application, and the power absorption is made fully effective periodically to maintain a fixed angular relation or to permit readjustment of the system to the steady state during transient departures from the synchronous relation in contradistinction to the arrangement described in the above identified Alexanderson application wherein the amount of power flow in the branch circuit varies continuously to maintain synchronism. In accordance with our present invention the artificial load preferably comprises a resistance which is caused to absorb power by means of electric valves arranged to operate at a "floating" point in the control between a fully conductive or a nonconductive condition in accordance with the arrangement described and claimed in a copending application of E. F. W. Alexanderson and S. P. Nixdorff, Serial No. 581,368, filed December 16, 1931, and assigned to the assignee of the present application.

Figure 2:
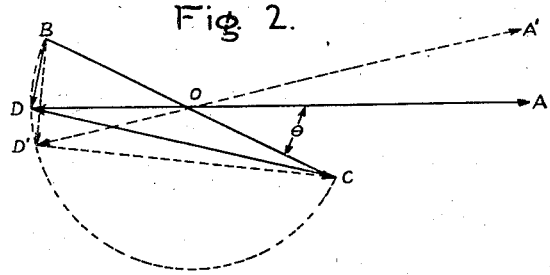

The novel features which we believed to be characteristic of our invention are set forth with particularity in the appended claims. The invention itself, however, both as to organization and method of operation together with further objects and advantages thereof will best be understood by reference to the following description taken in connection with the accompanying drawings in which Fig. 1 is a diagrammatic representation of one embodiment of our invention for a single phase system in which a power absorbing circuit is connected to receive direct current power through electric discharge devices; Fig. 2 is a diagram to aid in the understanding of the operating cycle of the electric discharge devices shown in Figs. 1 and 3, and Fig. 3 is a diagrammatic representation of a modification of the embodiment of our invention for a polyphase system in which a power absorbing circuit is connected to receive alternating current power through electric discharge devices.

Referring to Fig. 1 of the drawings, we have illustrated a single phase transmission system comprising a transmitting station diagrammatically represented as a synchronous generator 1, a transmission line represented by the conductors 2 and a receiving circuit represented by synchronous machines 3, which may be taken to represent synchronous generators, or motors, or both. A conventional circuit interrupting means in the transmission line is represented by the switch 4. A power absorbing circuit represented by the resistor 5 is connected to the generator terminals, or generator bus, through electric discharge devices 6 and 7 and transformer 8. The electric discharge devices each comprise an anode, a cathode, and a control electrode, or grid, and are preferably of the vapor electric discharge type, or any type of electric valve in which the starting of current through the valve is controlled in accordance with the phase relation between an anode and grid potentials. The valves 6 and 7 are connected to be energized in accordance with the voltage of the generator circuit and as illustrated are connected to the circuit 2 through the transformer 8 for obtaining full wave rectification. The grids of the valves are connected to their common cathode circuit through opposite halves of the secondary winding of a grid transformer 9 and a current limiting resistor 10. The absorbing circuit 5 is connected to the midpoint of the secondary winding of transformer 8 and to the cathode circuit of the valves.

In order to maintain a given angular relation between the dynamo-electric machines 1 and 3 or to restore a synchronous relation therebetween following transient disturbances, the power absorbing circuit is made operative to absorb power to its full capacity periodically until the desired conditions are obtained or restored. For this purpose we provide a grid potential for the valves 6 and 7 which bears a predetermined relation to the time-phase position of the receiver voltage vector and as illustrated comprises a voltage component derived from a communication channel represented as a pilot wire circuit connected to the receiver circuit. The potential applied to the grids of the electric valves oscillates about the 180 degree reversed phase position relatively to the anode potential instead of between the in-phase and quadrature position as in the usual method of control of valves of this type and the power absorbed oscillates to maintain a predetermined phase relation between the transmitting and receiving machines.

To obtain the desired grid excitation we have illustrated means for deriving a potential from the received circuit 3 through a phase advancing circuit comprising a serially connected reactor 11 and resistor 11a. The potential across the resistor is impressed upon an impedance phase shifting circuit including a transformer 12 having a primary winding connected to the resistor 11a and a secondary winding connected to energize a serially connected saturable reactor 13 and a resistor 14. The primary winding of grid transformer 9 is connected between the electrical midpoint of the secondary winding of transformer 12 and the junction between reactor 13 and resistor 14. Reactor 13 is provided with saturating windings 15 which are energized in accordance with the variations in power absorbed in the load circuit 5 and, as illustrated, are connected across a variable portion of the resistor 5 through an adjustable connection 16.

The operation of the embodiment of our invention illustrated in Fig. 1 is substantially as follows: If the generator 1 is supplying a given load to the receiving circuit 3 and the circuit breaker 4 opens, due to a fault on the transmission line, or if the load is suddenly removed due to any other cause, the generator will tend to speed up and increase the angular relation between the generator and receiver circuit voltage vectors. However, if, at the same instant, an average load be thrown on the generator 1 by means of the rectifier arrangement equal to that which has been disconnected, the phase relation of the potential of generator 1 with respect to the receiving circuit will not be disturbed. Similarly, if the average load on the machine 1 due to the rectifier arrangement is varied in equal and opposite amounts to any sudden or gradual change of load drawn from the generator 1 by the receiving circuit 3, the phase relation of the potential of the generator 1 may be maintained in a predetermined relation with respect to that of the receiving circuit 3 or any selected time-phase voltage vector of reference.

The manner in which the above described oscillating grid circuit operates to cause the load drawn by the power absorbing circuit to maintain a predetermined phase relation between the transmitting and receiving circuits will be better understood by reference to the vector diagram shown in Fig. 2.

In Fig. 2, with the assumption that circuit breaker 4 is closed and the system is operating under steady state conditions, the vector OA represents the anode potential of the electric valves 6 and 7. The vector BC represents the voltage impressed upon transformer 12 from the resistor 11a. This potential is retarded in phase with respect to the potential of the receiving circuit by the angle θ. It will be assumed at this time that no power is being transmitted through the rectifier arrangement to the power absorbing resistor 5 so that the saturating windings 15 will be deenergized. Under these conditions the impedance of the reactor 13 will be a maximum and the potential thereacross will be represented by the vector CD. The vector BD will represent the potential across the resistor 14. The potential from the midpoint of the secondary winding 12 and the junction point of reactor 13 and resistor 14 will be the potential applied to the grids of the valves 6 and 7 and will be represented by the vector OD which, it will be observed, is in direct phase opposition to the anode potential of these valves and consequently the valves 6 and 7 are maintained non-conductive. In case the load is removed from generator 1, the generator will tend to speed up and its terminal potential will advance to the position OA'. Under the new condition it will be observed that the grid potential OD is advanced less than 180° with respect to the anode potential OA' so that the valves 6 and 7 are fully conductive and the load 5 is thrown directly on the generator 1. This sudden application of load tends to slow down the generator and bring the potential OA' back into its previous position. At the moment current traverses the power absorbing resistor 5, the saturating windings 15 are energized, the reactor 13 approaches saturation, and its impedance decreases correspondingly. As the impedance of reactor 13 decreases, the potential drop thereacross decreases and may be represented at a given instant by the vector CD'. The grid potential of the valves 6 and 7 is thus advanced to the position represented by vector OD' which it will be observed, is in phase opposition to the anode potential of the valves represented by the vector OA'. As the saturation of reactor 13 is further increased, the vector OD will move beyond the position OD', or the position of phase opposition, and the valves 6 and 7 will become completely non-conductive so that the resistance load is removed from generator 1. When the current traversing resistor 5 is interrupted, the saturating windings 15 are deenergized so that the saturation of reactor 13 decreases, thereby shifting the grid potential of the valves until the grid potential OD is advanced less than 180° with respect to the anode potential OA and again connecting the power absorbing resistor 5 to generate 1. In this manner the grid potential is oscillated about the 180° point, so that the valves are alternately fully conductive and fully non-conductive, at a frequency which is dependent upon the constants of reactor 13 and generator 1. It will be observed that the average phase relation between the vector OA' corresponding to the potential of generator 1, and the vector OA, corresponding to the potential of the receiving circuit 3, will be determined by the average value of the vector CD, representing the potential across the reactor 13, which, in turn will be determined by its saturation varying in accordance with the current traversing the load resistor 5. By properly adjusting the variable connection 16, any predetermined phase relation may be maintained between the generator and receiving circuit 3.

In Fig. 3 of the drawings we have illustrated an embodiment of our invention in a polyphase transmission system with polyphase alternating current power absorption in contradistinction to direct current power absorption and electric valves functioning as relays to control the valves in the power absorbing circuit in contradistinction to direct grid control from the receiving circuit communication channel as shown in Fig. 1. The generating circuit is represented by synchronous generators 17 and the receiving circuit is presented by synchronous machines 18. The generators 17 are connected to a generator bus 19 which in turn is connected to a high voltage distribution bus 20, while the synchronous machines 18 are connected to a receiving circuit bus 21. A transmission line, illustrated in accordance with the common commercial practice as comprising two circuits 22 and 23, interconnects the generating and receiving circuit buses. These circuits are shown dotted for a portion of their length to indicate diagrammatically the remote relation of the generating and receiving circuits. A conventional circuit interrupting means in each of the transmission circuits 22 and 23 is represented by the switches 24 and 25 respectively. The usual step-up and step-down transformers and other equipment not required for an understanding of the invention have been omitted in order to simplify the drawings. A power-absorbing circuit is represented by the resistors 26, 27 and 28. Each of the respective resistors has one terminal thereof connected directly to a different phase conductor of the generator bus 19 and the remaining terminals are connected through electric discharge devices to form a star connection of the resistors. The electric discharge devices are preferably electric valves of the vapor discharge type each provided with an anode, a cathode and a control grid in which the starting of current through the respective valves is controlled in accordance with the phase relation between the anode and grid potentials. As illustrated in the drawings the neutral end connection terminals of resistors 26, 27 and 28 are connected through groups of valves comprising valves 29 and 30, 31 and 32, and 33 and 34, respectively. The valves in each group are reversely connected in parallel with an anode and a cathode of each valve of a given group connected to a terminal of its associated resistor and the remaining anode and cathode connected to a common neutral connection 35 in a manner to transmit alternating current. The valves 29 and 30 are provided with a grid control circuit comprising a grid transformer 36 having a primary winding 37 and secondary windings 38 and 39 connected to energize the grids of valves 29 and 30, respectively. A grid bias battery 40 and a current limiting resistance 41 are connected in the grid circuit of valve 29, and a grid bias battery 42 and current limiting resistor 43 are connected in the grid circuit of valve 30. The valves 31 and 32 are similarly provided with a grid transformer 44, having a primary winding 45 and two secondary windings 46 and 47 connected respectively through a bias battery 48 and resistance 49, and a bias battery 50 and resistance 51, to energize the grid circuits of the valves 31 and 32. The valves 33 and 34 are likewise provided with a grid transformer 52 having a primary winding 53 and two secondary windings 54 and 55 connected respectively through a bias battery 56 and resistance 57, and bias battery 58 and resistance 59, to energize the grid circuits of the valves 33 and 34.

In order to provide a more positive, speedy, and reliable control with the present type of commercially available large power vapor discharge devices we have found it preferable to provide auxiliary electric discharge devices controlled in accordance with the regulated condition to effect control of the grid circuits of the large power vapor discharge devices. The auxiliary electric discharge devices are preferably of the same type as the power discharge devices, namely, electric valves of the vapor discharge type each provided with an anode, a cathode and a control grid in which the starting of current through the respective valves is controlled in accordance with the phase relation between the anode and grid potentials. As illustrated a pair of valves 60 and 61 are reversely connected in parallel for energizing the primary winding of grid transformer 36. A similarly connected pair of valves 62 and 63, and 64 and 65 are provided to energize the primary windings of grid transformers 44 and 52 respectively. The valves 60 and 61 are provided with a grid control circuit comprising a grid transformer 66 having a primary winding 67 and secondary windings 68 and 69 connected to energize the grids of valves 60 and 61, respectively. A grid bias battery 70 and a current limiting resistance 71 are connected in the grid circuit of valve 60, and a grid bias battery 72 and current limiting resistance 73 are connected in the grid circuit of valve 61. The valves 62 and 63 are similarly provided with a grid transformer 74, having a primary winding 75 and two secondary windings 76 and 77, connected respectively through a bias battery 78 and resistance 79, and a bias battery 80 and resistance 81, to energize the grid circuits of valves 62 and 63. The valves 64 and 65 are likewise provided with a grid transformer 82 having a primary winding 83 and two secondary windings 84 and 85 connected respectively through a bias battery 86 and resistance 87, and bias battery 88 and resistance 89, to energize the grid circuits of valves 64 and 65. The anode circuits of the pairs of valves 60 and 61, 62 and 63, and 64 and 65 are connected to be energized in accordance with the voltage of the generator bus 19 and as illustrated are connected to be energized through a three phase transformer having a primary winding 90 connected to be energized from the generator bus 19 and a secondary star connected winding 91 having the respective phases thereof connected to the anode circuit of the pair of valves which is arranged to control the grid circuit of the power valves in a corresponding phase of the generator bus 19. Resistances 92 and 93 are connected in series with the anode circuit of the pair of valves 60 and 61 and the primary winding 37 of grid transformer 36 is connected across resistance 93 through a direct current blocking condenser 94. The resistances 92 and 93 are made adjustable in order to provide means for initial calibration of the control circuit. In a similar manner adjustable resistances 95 and 96 are connected in the anode circuit of the pair of valves 62 and 63 with the primary winding of grid transformer 44 connected across resistance 96 through a blocking condenser 97. Resistances 98 and 99 are likewise connected in the anode circuit of the pair of valves 64 and 65 with the primary winding of grid transformer 52 connected across resistance 99 through a blocking condenser 100.

In review, it will be observed that the pair of valves 60 and 61 control the pair of power valves 29 and 30 which are associated with resistor 26, that valves 62 and 63 control the pair of power valves 31 and 32 which are associated with resistor 27, and that valves 64 and 65 control the pair of power valves 33 and 34 which are associated with resistor 28.

Since the anode potential of the control valves 60 and 61, 62 and 63, and 64 and 65 corresponds to the phase position of the potential of bus 19, a grid excitation for the control valves from the receiving bus 21 will provide means for controlling the power valves in accordance with the phase relation between the voltages of the two buses. In order to simplify the control it is preferable to use a single phase circuit to transmit the voltage of the receiving bus to the regulating equipment. This circuit is indicated by the conductors 101 which are shown dotted over a portion of their length to indicate the remote location of the receiving bus. Since the power absorbing and control equipment are polyphase it is necessary to convert the single phase receiving circuit voltage to a polyphase voltage. Means are also provided to prevent hunting and we have found that a comparatively simple expedient is to provide the anti-hunting means in the single phase circuit before conversion to the polyphase circuit.

To obtain the desired grid excitation for the control valves 60 and 61, 62 and 63, and 64 and 65, the potential from the circuit 101 is impressed upon an impedance phase shifting circuit including a transformer 102 having a primary winding connected to the circuit 101 and a secondary winding connected to energize a serially connected saturable reactor 103 and a resistor 104. The primary winding of a transformer 105 is connected between the electrical midpoint of the secondary winding of transformer 102 and the junction point between reactor 103 and resistor 104. Reactor 103 is provided with direct current saturating windings 106 which are energized in accordance with variations in power absorbed in the resistors 26, 27 and 28. In order to energize the saturating windings with direct current we provide a rectifying arrangement controlled in accordance with the power absorbed in the power absorbing circuit. As shown in the drawings, electric valves 107 and 108 are connected in the conventional manner to the bus 19 through transformer 109 for obtaining full wave rectification. The grids of the valves are connected to their common cathode circuit through opposite halves of the secondary winding of a grid transformer 110 through current limiting resistors 111 and 112, and a bias battery 113. An adjustable resistor 114 is connected in the anode circuit of the valves and the winding 106 is connected to be energized in accordance with the voltage across the resistor. The anti-hunting circuit comprises means responsive to the current in the power absorbing circuit for controlling the output of the rectifier valves 107 and 108 and as shown comprises a current transformer 115 having a primary winding connected in series relation with resistor 28 and a secondary winding connected to energize the primary winding of the rectifier grid transformer 110.

The single phase voltage from the transformer 105 is converted into two quadrature voltages by providing two secondary windings 116 and 117 and a phase shifting device in circuit with one of the windings. As shown a reactor 118 and an adjustable resistor 119 are connected in series relation with the output terminals of winding 116. Any of the known arrangements for transforming from two-phase voltages to three-phase voltages may be employed and by way of example we have shown diagrammatically the so-called T-connection comprising a main transformer winding 120 and a teaser winding 121. The terminals of the main transformer winding 120 are connected to winding 117 and the terminals of the teaser winding 121 are connected to the quadrature voltage component from winding 116. The respective terminals of the T-connected windings are connected to the primary winding of a rotary phase shifting transformer 122 by means of which the phase relation of the grid potential of valves 60 to 65 may be adjusted. Connections are made from the different phases of the secondary winding of transformer 122 to energize respectively the primary windings 67, 75 and 83 of the grid transformers of the control valves.

The operation of the embodiment of our invention illustrated in Fig. 3 is similar to the cycle of operation described for the illustrated embodiment of Fig. 1. If the generators 17 are supplying a given load to the receiving bus 21 and the load is suddenly removed from the transmitting bus 20 the generators will tend to accelerate so that there is an incipient departure from synchronism. However, if, at the same instant, an average load be thrown on the generator bus 19 by means of the power valves 29 to 34, inclusive, equal to that which has been disconnected, the phase relation of the transmitting bus 20 will not be disturbed. Similarly, if the average load on the generator bus 19 is varied in equal and opposite amounts to any sudden or gradual change of load on the transmitting bus 20, the phase relation of the potential of the transmitting bus may be maintained in a predetermined relation with respect to that of the receiving bus 21.

The manner in which the grid circuit of the control valves operates to cause the load drawn by the power absorbing circuit to maintain a predetermined phase relation or prevent displacement in excess of a predetermined value between the transmitting and receiving circuit voltages will be readily understood by reference to Fig. 2 and the accompanying description above, having in mind the following modifications. The control valves 60 to 65, inclusive, operate similarly to the arrangement of the power valves of Fig. 1 as described in the accompanying description. When the generator bus voltage starts to depart from the predetermined relation the relative shift in phase between the anode voltage and grid voltage is such as to render valves 60 to 65 fully conductive. As soon as the control valves pass current a voltage component appears across the resistors 93, 96 and 99 so as to overcome the normal grid bias voltage which maintains the power valves non-conductive, and renders the power valves fully conductive. As power is absorbed in the power absorbing circuit current transformer 115 is energized in such a manner as to increase the output of the rectifier group of valves 107 and 108 and cause an increase in energization of the saturating windings 106 of the phase shifting circuit. Under these conditions the saturation of the reactor 103 approaches saturation, and its impedance decreases correspondingly. As the impedance of reactor 103 decreases, the potential drop thereacross decreases and the grid potential of the control valves is advanced to a position in phase opposition with the anode voltage and the control valves will become completely non-conductive. The normal grid bias voltage of the power tubes thereby becomes effective to render the valves non-conductive and thereby remove the resistance load from the generator bus 19. When the current traversing the resistor 28 is interrupted, the saturating windings 106 are deenergized so that the saturation of the reactor 103 decreases, thereby shifting the grid potential of the valves until the grid potential is advanced less than 180° with respect to the anode potential and again connecting the power absorbing load to the generator bus 19. In this manner the grid potential of the control valves is oscillated about the 180° point, so that the valves are alternately fully conductive and fully non-conductive, at a frequency which is dependent upon the constants of the reactor 103 and the generators 17.

While we have shown and described but two embodiments of our invention it will readily occur to those skilled in the art that various changes and modifications may be made without departing from our invention in its broader aspects and we, therefore, aim in the appended claims to cover all such changes and modifications as fall within the true spirit and scope of our invention.

What we claim as new and desire to secure by Letters Patent of the United States, is:

1. In a system of distribution, a synchronous generating circuit, a synchronous receiving circuit, a power transmission circuit interconnecting said generating and receiving circuits, a power absorbing circuit, means for interconnecting said power absorbing circuit and said generating circuit, and means for varying the average power consumption in said power absorbing circuit in accordance with the advance of the generating circuit voltage vector from a predetermined phase position with respect to a selected time-phase voltage vector of reference.

2. In a system of distribution, a synchronous generating circuit, a synchronous receiving circuit, a power transmission circuit interconnecting said generating and receiving circuits, means including a power absorbing circuit for maintaining a synchronous relation between said generating and receiving circuits, and means for periodically connecting said power absorbing circuit to said generating circuit in accordance with any displacement in phase in excess of a predetermined value between the generating and receiving circuit voltage vectors.

3. In a system of distribution, a synchronous generating circuit, a synchronous receiving circuit, a power transmission circuit interconnecting said generating and receiving circuits, a power absorbing circuit, means for interconnecting said power absorbing circuit with said generating circuit, and means responsive to a transient departure of the generating circuit voltage vector from any selected time-phase voltage vector of reference for changing the power consumption in said power absorbing circuit between successive minimum and maximum values which are averaged in a manner to maintain a synchronous relation between said generating and receiving circuits.

4. In a system of distribution, a synchronous generating circuit, a synchronous receiving circuit, a power transmission circuit interconnecting said generating and receiving circuits, means for absorbing power locally at said generating circuit, and means for alternately varying the power absorption in said power absorbing means between its maximum and minimum limits in accordance with a displacement in phase in excess of a predetermined value between the generating and receiving circuit voltage vectors.

5. In a system of distribution, a synchronous generator, a synchronous receiving circuit, a power transmission circuit interconnecting said generator and said receiving circuit, a normally disconnected kilowatt load device for stabilizing said system, and means operative in accordance with a transient departure in generator speed from the synchronous speed of the system for alternately connecting and disconnecting said load device to and from said generator terminals.

6. In a system of distribution, a synchronous generating circuit, a synchronous receiving circuit, a power transmission circuit interconnecting said generating and receiving circuits, a power absorbing circuit, and means including an electric valve for periodically connecting said power absorbing circuit to said generating circuit in accordance with the advance of the generating circuit voltage vector from a predetermined phase position with respect to a selected time-phase voltage vector of reference.

7. In a system of distribution, a synchronous generator, a synchronous receiving circuit, a power transmission circuit for interconnecting said generator and said receiving circuit, a power absorbing circuit, means including an electric valve for interconnecting said power absorbing circuit and said generator, and means variable in accordance with the angular deviation of the generator voltage vector from a predetermined angular relation with the receiving circuit voltage vector for rendering said valve alternately completely conductive and non-conductive.

8. An electric translating system comprising an alternating current generator, an alternating current distribution circuit, means for regulating the phase relation between the potentials of said generator and said circuit comprising a load device, means for interconnecting said load device and said generator including a discontinuous control electric valve provided with a control grid, a grid circuit for said valve connected to be energized in accordance with the time-phase position of the distribution circuit voltage vector, and a regenerative connection between the circuit of said load device and said grid circuit.

9. In a system of distribution, an alternating current generator, an alternating receiving circuit, a power transmission circuit interconnecting said generator and receiving circuit for synchronous operation, means for regulating the phase relation between the potentials of said generator and said receiving circuit comprising a load device, means for interconnecting said load device and said generator including a discontinuous control electric valve provided with an anode, a cathode and a control grid, said anode being energized in accordance with the potential of said generator, a grid circuit for said valve connected to be energized from said receiving circuit, and means responsive to the energization of said load device for shifting the potential of said control grid relative to its anode potential about the point of phase opposition.

10. In a system of distribution, an alternating current generator, an alternating current receiving circuit, a power transmission circuit interconnecting said generator and receiving circuit, means for regulating the phase relation between the potentials of said generator and said receiving circuit comprising a resistance power absorbing circuit, rectifying means including a vapor electric discharge device for interconnecting said generator and said power absorbing resistance, said discharge device having an anode, a cathode and a control grid, said anode being connected to be energized in accordance with the magnitude and phase position of the generator potential, a grid circuit for said discharge device, an impedance network for producing a voltage component in said grid circuit proportional to said receiving circuit voltage and substantially in phase opposition to said anode potential when said generator and receiving circuit are in synchronous relation, and means responsive to current traversing said resistance for shifting said grid circuit potential in a direction to render said valve non-conductive.

11. In a system of distribution, an alternating current generator, an alternating current receiving circuit, a power transmission circuit interconnecting said generator and receiving circuit, means for regulating the phase relation between the potentials of said generator and said receiving circuit comprising a resistance power absorbing circuit, rectifying means including a vapor electric discharge device for interconnecting said generator and said power absorbing resistance, said discharge device having an anode, a cathode, and a control grid, said anode being connected to be energized in accordance with the magnitude and phase position of the generator potential, a grid circuit for said discharge device, an impedance phase shifting circuit including a saturable reactor for producing a voltage component in said grid circuit proportional to said receiving circuit voltage and substantially in phase opposition to said anode potential when said generator and receiving circuit are in synchronous relation, and a saturating winding for said saturable reactor connected to be energized in accordance with the power absorbed in said resistance.

12. In a system of distribution, a synchronous generating circuit, a synchronous receiving circuit, a power transmission circuit interconnecting said generating and receiving circuits, means including an alternating power absorbing circuit for maintaining a synchronous relation between said generating and receiving circuits, and means including a pair of electric valves reversely connected in parallel for connecting said power absorbing circuit to said generating circuit.

13. In a system of distribution, a synchronous generating circuit, a synchronous receiving circuit, a power transmission circuit interconnecting said generating and receiving circuits, means including an alternating power absorbing circuit for maintaining a synchronous relation between said generating and receiving circuits, means including a pair of electric valves reversely connected in parallel for connecting said power absorbing circuit to said generating circuit, means including a second pair of electric valves for controlling the conductivity of said first mentioned pair of valves, and means responsive to a transient departure of said generating circuit from synchronism for controlling the conductivity of said second mentioned pair of valves.

14. In a polyphase system of distribution, a synchronous generating circuit, a synchronous receiving circuit, a power transmission circuit interconnecting said generating and receiving circuits, an alternating power absorbing circuit comprising a plurality of resistors connected to said generating circuit, a plurality of electric valves for controlling the power absorbed in said resistors, means including electric valves for controlling the conductivity of said first mentioned electric valves, and means for controlling the conductivity of said second mentioned valves in accordance with the phase relation between the voltages of said generating and receiving circuits.

15. In a polyphase system of distribution, a synchronous generating circuit, a synchronous receiving circuit, a power transmission circuit interconnecting said generating and receiving circuits, an alternating power absorbing circuit comprising a plurality of resistors connected to said generating circuit, a plurality of pairs of electric valves having the valves in each pair reversely connected in parallel for connecting said resistors in star, means including a second group of electric valves comprising valves connected in pairs and reversely connected in parallel for controlling the conductivity of said first mentioned electric valves, each of said second group of valves being provided with a control grid, a single phase communication channel for transmitting a voltage component from said receiving circuit to the grid circuit of said second group of valves, transforming means for converting the single phase voltage from said communication channel to a polyphase voltage corresponding to the number of pairs of said second group of valves, and a polyphase transformer connected to energize the respective grid circuits of said second group of valves.

16. In a three phase system of distribution, a synchronous generator, a receiving circuit, a power transmission circuit interconnecting said generator and receiving circuits, a plurality of resistors connected respectively to different phase conductors of said generator, a first group of electric valves comprising valves connected in pairs and reversely connected parallel for connecting said resistors in star, each of said valves having an anode and a control grid, the anodes of said valves being energized in accordance with the voltage of said generator, means including a second group of electric valves comprising valves connected in pairs and reversely connected in parallel for controlling the conductivity of said first group of valves, each of the valves of said second group having an anode, and a control grid, means for energizing the anodes of said second group of valves in accordance with the voltage of said generator, a single phase pilot wire circuit for interconnecting said receiving circuit and the grid circuit of said second group of valves, a phase shifting network including a resistor and a saturable reactor connected to be energized from said pilot wire circuit, means for varying the saturation of said reactor in accordance with the power absorbed in said plurality of resistors, means connected to said phase shifting network for converting a single phase voltage component thereof to three phase voltages, transforming means energized in accordance with said three phase voltages for energizing the grid circuits of the pairs of valves in the respective phases of said second group of valves, resistance units in the anode circuit of each pair of said second group of valves, and grid transformers for each pair of valves of said first group connected to be energized in accordance with the voltage across resistance units in the corresponding phase groups of said second group of valves.

17. In a three phase system of distribution, a synchronous generator, a receiving circuit, a power transmission circuit interconnecting said generator and receiving circuits, a plurality of resistors connected respectively to different phase conductors of said generator, a first group of electric valves comprising valves connected in pairs, and reversely connected in parallel for connecting said resistors in star, each of said valves having an anode, and a control grid, the anodes of said valves being energized in accordance with the voltage of said generator, means including a second group of electric valves comprising valves connected in pairs and reversely connected in parallel for controlling the conductivity of said first group of valves, each of the valves of said second group having an anode, and a control grid, means for energizing the anodes of said second group of valves in accordance with the voltage of said generator, a single phase pilot wire circuit for transmitting a voltage component from said receiving circuit to the grid circuit of said second group of valves, a phase shifting network, including a resistor and a saturable reactor provided with a saturating winding, connected to be energized from said single phase circuit, rectifying means connected to said generating circuit, a current transformer connected in circuit with one of said star connected resistors and having a secondary winding connected to control the output current of said rectifying means, means for energizing said saturating winding in accordance with the output current of said rectifying means, means connected to said phase shifting network for converting a single phase voltage component thereof to three phase voltages, rotary phase shifting transforming means energized in accordance with said three phase voltages for energizing the grid circuits of the pairs of valves in the respective phase of said second group of valves, resistance units in the anode circuit of each pair of said second group of valves, grid transformers for each pair of valves of said first group each having a primary winding connected respectively across resistance units in corresponding phases of said second group of valves, and a blocking condenser in series with each of said primary windings.

In witness whereof we have hereunto set our hands.

ERNST F. W. ALEXANDERSON.
SAMUEL P. NIXDORFF.
PHILIP L. ALGER.